United States Patent Office
3,336,997
Patented Aug. 22, 1967

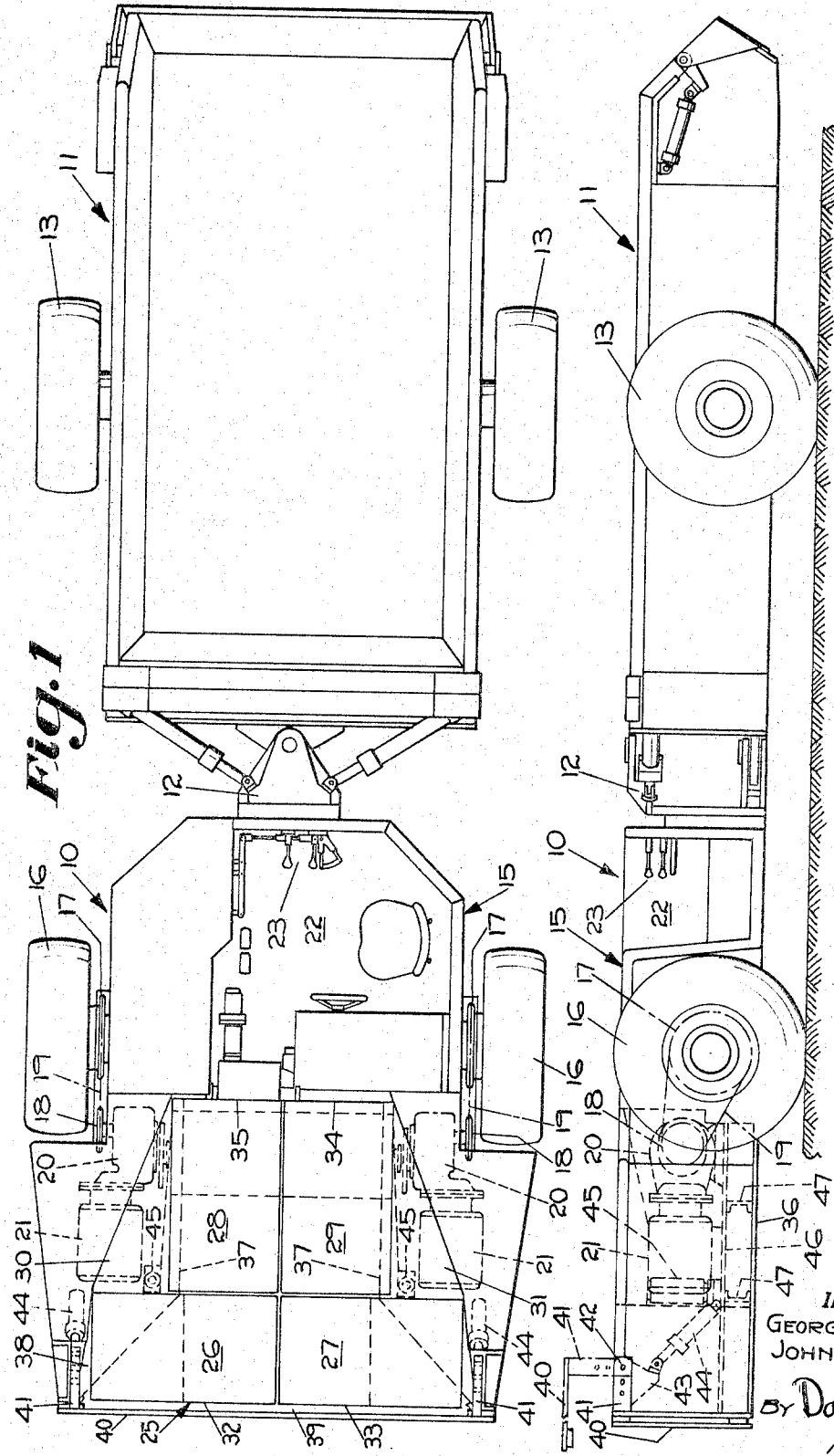

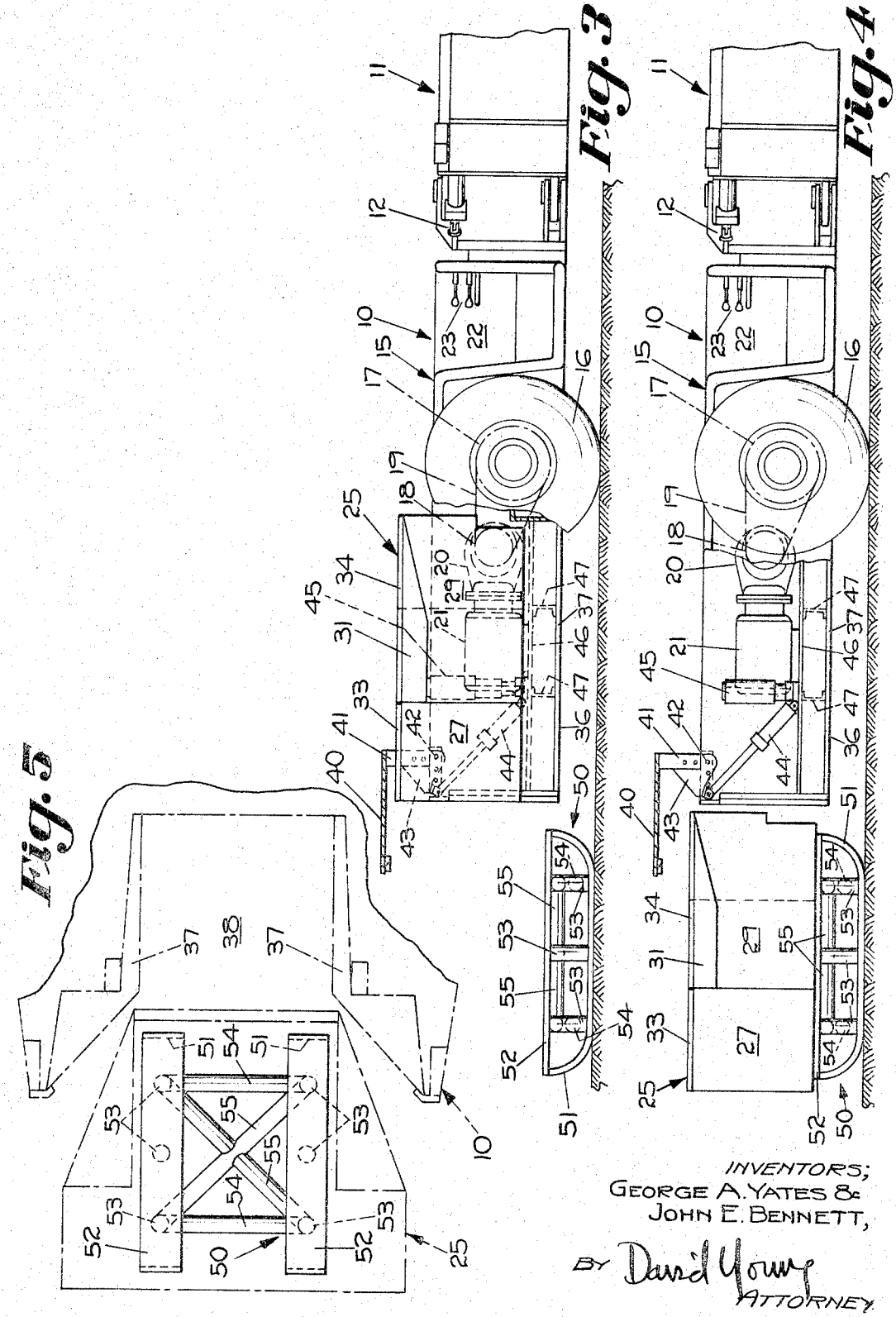

3,336,997
ELECTRIC BATTERY POWER OPERATED
VEHICLE
George A. Yates, Grove City, and John E. Bennett, Columbus, Ohio, assignors to Jeffrey Galion Manufacturing Company, a corporation of Ohio
Filed May 21, 1965, Ser. No. 457,757
12 Claims. (Cl. 180—65)

ABSTRACT OF THE DISCLOSURE

An electric battery power operated vehicle with the battery being supported in the main frame, in which there is a bottom opening and an end opening that forms a continuation of the bottom opening. The bottom opening provides access to the battery for removal of the battery through the end opening and for substitution of another battery.

---

The instant invention relates to electric battery power operated vehicles in which the electric battery is carried in the vehicle, and more particularly, to an improved construction of such vehicle for facilitating the loading and unloading of the battery.

In underground coal mining operations, it is customary to operate the mining equipment by electric power. With mobile equipment, it is usual to lead an electric line from the power source to the equipment and to provide suitable mechanism for handling the electric line, as the equipment moves about in the mine. Such mechanism may be in form of a cable reel to pay out and to reel in the electric line, in accordance with the movements of the mobile equipment. The electric line is eliminated in equipment that has an electric battery as the source of power for operating the equipment. However, in utilizing a battery power source, the equipment has to be constructed in such manner as to accommodate the bulk of the electric battery, and also, suitable arrangements must be made for removing the battery from the vehicle for recharging, and for replacement with a charged battery for continued operation of the equipment.

Accordingly, it is an object of this invention to provide an improved construction of an electric battery power operated vehicle, including means to facilitate the removal and replacement of the battery.

It is another object of the instant invention to provide an improved construction of an electric battery power operated vehicle in which the battery may be quickly removed from the vehicle, and replaced with a charged battery, with minimal interruption of service of the vehicle.

It is a further object of the invention to provide an improved construction of an electric battery power operated vehicle in which the vehicle itself includes the means whereby the battery may be easily removed from the vehicle and replaced with a charged battery for continued operation of the vehicle.

It is still another object of this invention to provide an improved construction of an electric battery power operated vehicle in which the vehicle is self propelled to a battery removal station for removing the battery from the vehicle, and is self-propelled to another station at which a charged battery is loaded into the vehicle to exchange batteries without any significant interruption of service of the vehicle.

It is still a further object of this invention to provide an electric battery power operated vehicle that is particularly well adapted to mine operations in that the battery of such vehicle may be changed in a place having low headroom over the vehicle.

It is still another object of the invention to provide an improved electric battery power operated vehicle that is constructed to conveniently receive and support the battery in the vehicle in such manner as to facilitate exchange of the battery.

Other objects of the invention will appear hereinafter, the novel features and combinations being set forth in the appended claims.

In the drawings:

FIG. 1 is a plan view of an electric battery power operated vehicle, constructed in accordance with this invention;

FIG. 2 is a side elevational view of the electric battery power operated vehicle;

FIG. 3 is a side elevational view of the vehicle, partially in section, with the battery box in elevated position preparatory to removal of the battery box;

FIG. 4 is a side elevational view of the vehicle, partially in section, with the battery box removed and placed on a battery sled; and FIG. 5 is a plan view of the battery sled, with the battery box and vehicle illustrated in phantom lines.

Referring to the drawings, there is illustrated in FIG. 1 an electric battery power operated vehicle comprising a tractor 10 and a truck body 11, which are connected by a suitable articulated hitch connection 12. The tractor 10 is powered for propulsion and operation of the vehicle, and to pull the truck body 11 and its load of material. The truck body 11 is supported for movement by a pair of wheels 13, 13.

The tractor 10 has a main frame 15 which is supported by a pair of wheels 16, 16, for propulsion of the tractor 10 and to pull the truck body 11 on its wheels 13, 13. Each wheel 16 has a driven sprocket 17 which is connected to a drive sprocket 18 by a drive chain 19, whereby power is delivered to the wheels 16, 16. Each drive sprocket 18 is connected to a mechanical transmission 20, which in turn is connected to an electric motor 21. As best seen in FIG. 1, there is a mechanical transmission 20 and an electric motor 21 at each side of the main frame 15, for each wheel 16. Each mechanical transmission 20 is securely connected to its electric motor 21, to be driven by the latter. There is an operator's station 22 at the rear of the main frame 15, at which there are located various controls 23 for operation of the tractor 10.

Power for the tractor 10 is supplied by a battery comprising a plurality of battery cells in a battery box 25, which is received in the main frame 15 at the front end thereof. In the illustrated embodiment of the invention, the battery box 25 comprises four rectangular sections 26, 27, 28, 29, each of which has a rectangular form in plan view, as seen in FIG. 1. Each of the battery sections 26, 27, 28, 29 may be further subdivided to receive the battery cells. The battery box 25 has a T configuration, in which the battery box sections 26, 27 are arranged across the front end of the tractor 10 to form the cross arms of the T. The battery sections 28, 29 extend rearwardly and longitudinally into the main frame 15 of the tractor 10, and form the leg of the T configuration. In the corner between the battery box sections 26, 28, there is a lateral wing 30 having a triangular form. A like lateral wing 31, having a triangular form, is disposed in the corner between the battery box sections 27, 29. The battery box sections 26, 27, 28, 29 are closed by covers 32, 33, 34, 35, respectively, for protection of the battery cells. The several covers 32, 33, 34, 35 may be hinged and secured in place in a suitable manner.

The main frame 15 of the tractor 10 has a bottom plate 36 at each side, which extends laterally inwardly towards the longitudinal center line of the tractor 10, to form a supporting shelf 37 for the battery box 25 at each side of the battery compartment 38 in the front end of the tractor 10. The supporting shelves 37 extend along the opposite sides of the battery compartment 38. The battery compartment 38 has a substantially T configuration that is complemental to the battery box 25, for reception of the latter. When the battery box 25 is placed in the battery compartment 38, it is seated on the opposite shelves 37, whereby the battery box 25 is supported on the main frame 15.

The opposite supporting shelves 37, 37 are spaced from each other to provide an opening therebetween in the bottom of the main frame 15 of the tractor 10. The front end of the main frame 15, ahead of the battery box 25, has an opening 39 which is somewhat larger than the size of the battery box 25, to permit the latter to be removed and replaced through the front opening 39.

The front opening 39 is normally closed by an upright gate 40, which forms the front wall of the tractor 10. A hinge arm 41 is secured to each end of the upright gate 40 and is pivotally connected to the main frame 15 on a pin 42. A lever 43 depends from the hinge arm 41, and a cylinder and piston mechanism 44 is connected between each lever 43 and the main frame 15, for operation of the gate 40, to swing the latter upwardly to the position seen in FIGS. 3 and 4. Upon such upward swinging movement, the gate 40 is raised to a position spaced above the main frame 15. The height of the gate 40 in its open position is determined by the length of the hinge arm 41. Alternate pivot points may be provided for the hinge arm 41, where it is desired to change the height of the gate 40 in its open position.

When it is desired to remove the battery box 25 from the tractor 10, the first step in such operation is to swing the gate 40 upwardly, thereby to open the front end of the tractor 10. The next step is to raise the battery box 25 upwardly off the opposite supporting shelves 37, 37. For this purpose, there is a pair of jacks 45, 45, which are disposed one at each side of the battery box 25, in the opposite corners of the T configuration, between the battery box sections 26, 28, and between the battery box sections 27, 29. Each jack 45 may be a hydraulic cylinder and piston device, which is extended to raise the battery box 25 upwardly off the supporting shelves 37, 37, and alternatively, is contracted to lower the battery box onto the supporting shelves 37, 37.

The main frame 15 includes a platform 46 at each side of the battery compartment 38, as best seen in FIGS. 3 and 4. The platforms 46, 46 are formed by plate members of the main frame 15, and such plate members are placed above the bottom plates 36, 36 of the main frame 15, with channels 47, 47 being interposed to support the platforms 46, 46 on the bottom plates 36, 36. The jacks 45 are secured to the platforms 46, 46 to be in upstanding positions in the corners of the T configuration of the battery box. When the battery box 25 is disposed in the battery compartment 38, the lateral wings 30, 31 overlie the jacks 45, 45. Thus, the jacks 45, 45 act between the platforms 46, 46 of the main frame 15 and the lateral wings 30, 31 of the battery box 25, to elevate and lower the latter. Each platform 46 also supports and has secured theterto a transmission 20 and electric motor 21.

When the battery box 25 has been raised upwardly off the supporting shelves 37, 37 by extension of the jacks 45, 45, it is disposed in an elevated position in the battery compartment 38, as seen in FIG. 3. The vehicle, comprising the tractor 10 and the truck body 11, may then be driven forwardly over a battery sled 50. Such battery sled 50 has opposite runners 51, 51 disposed on the ground surface, and shelf members 52, 52, each of which extends across the top of a runner 51 and is secured to the latter, as by welding. A plurality of posts 53 are interposed between each runner 51 and shelf member 52, and are secured thereto, as by welding. Lateral cross members 54, 54 and diagonal cross members 55, 55 extend between the upright posts 53, and are secured to the latter and to each other, as by welding. The battery sled 50 is thus formed as a completely rigid unit to support the weight of the battery box 25.

The width of the battery sled 50 is less than the distance between the edges of the opposite shelf members 37, 37, and the height of the sled 50 is greater than the level of the opposite shelf members 37, 37, but less than the bottom of the battery box 25 in its elevated position. The relative dimensional relationship of the battery sled 50, with respect to the battery box 25, and the battery supporting shelves 37, 37, in plan view, is illustrated in FIG. 5. Thus, when the tractor 10 is driven forwardly, the battery sled 50 will be received in the battery compartment 38, between the edges of the opposite supporting shelves 37, 37 and below the bottom of the battery box 25. If there is any misalignment of the battery sled 50, it will be guided in, between the edges of the battery supporting shelves 37, 37, upon engagement of the battery sled 50 with the main frame 15. The battery box 25 may then be lowered, by contraction of the jacks 45, 45 below the wings 30, 31, which will cause it to come to rest on the shelf members 52, 52 of the battery sled 50. Since the shelf members 52, 52 are higher than the level of the shelf members 37, 37, the battery box 25 is now supported above the level of the latter, and the tractor 10 may then be backed away from the battery sled 50 and the battery box 25, leaving the latter behind, as seen in FIG. 4. This completes the removal of the battery box 25 from the vehicle tractor 10.

In the removal of the battery box 25, it is raised upwardly off the battery supporting shelves 37, 37 only a relatively small distance. Thus, there need not be very much headroom above the tractor 10 for removal of the battery box 25. This feature of the construction causes the vehicle to be particularly well suited to operations in mines in which there may be very little headroom or clearance above the equipment.

The vehicle tractor 10 includes suitable electrical connections for the electrical devices thereof, and a cable from the battery box 25 to connect the battery cells to the electrical elements of the tractor 10. When a battery box 25 is removed from the tractor 10, the cable of such battery box 25 is disconnected. Thereafter, the cable of a battery box 25 containing a charged battery, on another nearby battery sled 50 may be connected to the tractor 10, and the latter may then be propelled to such nearby battery sled 50 to pick up the charged battery. In this operation, an extension cable may be utilized to provide the necessary reach to the battery box 25 with the charged battery.

The operation for replacing the battery box 25 is the reverse of that for removing it from the tractor 10. Thus, the tractor 10 is driven forwardly in over the battery sled 50, the jacks 45, 45 are extended to raise the battery box 25 up off the battery sled 50, the tractor 10 is then backed away, clear of the battery sled 50, and the jacks 45, 45 are contracted below the wings 30, 31 to lower the battery box 25 onto the battery supporting shelves 37, 37 in the battery compartment 38. The gate 40 is then dropped, to close the front opening 39.

This invention provides an improved construction of an electric power-operated vehicle, in which a battery is utilized as a power source, and by which such battery may be quickly and easily removed from the vehicle, and replaced with a fresh battery, for continued operation. The removal and replacement of the battery is accomplished by the operation of the vehicle itself, including devices that are contained within the vehicle. The battery which is removed from the vehicle is deposited on a battery sled, for recharging of the spent battery, and a charged battery may be picked up from another battery sled at an adjoining location.

Obviously those skilled in the art may make various changes in the details and arrangements of parts without departing from the spirit and scope of the invention as defined by the claims hereto appended, and applicants therefore wish not to be restricted to the precise construction herein disclosed.

Having thus described and shown an embodiment of the invention, what it is desired to secure by Letters Patent of the United States is:

1. An electric battery power operated vehicle comprising, a main frame, traction means supporting the main frame for propulsion of the vehicle, an electric battery for supplying power for operation of said vehicle, a battery compartment in said main frame for disposition of said electric battery, a battery supporting shelf in said battery compartment, one end of said main frame including an opening that extends from the end of said main frame to below said battery compartment and providing access to the battery from beneath said battery for removal of the battery from said battery compartment through the end opening of the main frame and for placement of the battery in said battery compartment through the end opening of the main frame.

2. An electric battery power operated vehicle comprising, a main frame, traction means supporting the main frame for propulsion of the vehicle, an electric battery for supplying power for operation of said vehicle, a battery compartment in said main frame for disposition of said electric battery, a battery supporting shelf in said battery compartment, an opening in the bottom of said battery compartment providing access to said electric battery, one end of said main frame including an opening to said battery compartment that forms a continuation of said bottom access opening and providing access to the battery through said bottom opening from beneath said battery for removal of the battery from said battery compartment through the end opening of the main frame and for placement of the battery in said battery compartment through the end opening of the main frame.

3. An electric battery power operated vehicle comprising, a main frame, traction means supporting the main frame for propulsion of the vehicle, an electric battery for supplying power for operation of said vehicle, a battery compartment in the front end of said main frame for disposition of said electric battery, a battery supporting shelf in said battery compartment, an opening in the bottom of said battery compartment providing access to said electric battery, the front end of said main frame including an opening to said battery compartment that forms a continuation of said bottom access opening and providing access to the battery through said bottom opening from beneath said battery in order to propel the vehicle forwardly to a battery discharge station and to remove the battery from said battery compartment through the front end opening of the main frame and for placement of the battery in said battery compartment through the front end opening of the main frame.

4. An electric battery power operated vehicle comprising, a main frame, traction means supporting the main frame for propulsion of the vehicle, an electric battery for supplying power for operation of said vehicle, a battery compartment in said main frame for disposition of said electric battery, a battery supporting shelf at each side of said battery compartment, each of said battery supporting shelves extending laterally inwardly into said battery compartment and being spaced from each other to provide an opening in the bottom of said battery compartment for access to said electric battery, one end of said main frame including an opening to said battery compartment that forms a continuation of said bottom access opening and providing access to the battery through said bottom opening from beneath said battery for removal of the battery from said battery compartment through the end opening of the main frame and for placement of the battery in said battery compartment through the end opening of the main frame.

5. An electric battery power operated vehicle comprising, a main frame, traction means supporting the main frame for propulsion of the vehicle, an electric battery for supplying power for operation of said vehicle, a battery compartment in said main frame for disposition of said electric battery, a battery supporting shelf in said battery compartment, power jack means disposed between said main frame and said battery to raise the battery up from the shelf, an opening in the bottom of said battery compartment providing access to said electric battery, one end of said main frame including an opening to said battery compartment that forms a continuation of said bottom access opening and providing access to the battery through said bottom opening from beneath said battery for removal of the battery from said battery compartment through the end opening of the main frame and for placement of the battery in said battery compartment through the end opening of the main frame.

6. An electric battery power operated vehicle comprising, a main frame, traction means supporting the main frame for propulsion of the vehicle, an electric battery for supplying power for operation of said vehicle, a battery compartment in the front end of said main frame for disposition of said electric battery, a battery supporting shelf in said battery compartment, an opening in the bottom of said battery compartment providing access to said electric battery, the front end of said main frame being open to said battery compartment that forms a continuation of said bottom access opening and providing access to the battery through said bottom opening from beneath said battery in order to propel the vehicle forwardly to a battery discharge station and to remove the battery from said battery compartment through the end opening of the main frame and for placement of the battery in said battery compartment through the end opening of the main frame, a door normally closing said end opening, and means to open said door to a position clear of said end opening.

7. An electric battery power operated vehicle comprising, a main frame, traction means suporting the main frame for propulsion of the vehicle, an electric battery for supplying power for operation of said vehicle, a battery compartment in said main frame for disposition of said electric battery, said battery compartment extending to the front end of said vehicle, portions of said main frame extending into said battery compartment and forming a battery supporting shelf for said battery, an opening in the bottom of said main frame providing access to the battery in said battery compartment, a front end opening in said main frame that forms a continuation of said bottom opening and providing access to the battery through said bottom opening from beneath said battery for removal of the battery from said battery compartment through the front end opening of the main frame and for placement of the battery in said battery compartment through the front end opening of the main frame.

8. An electric battery power operated vehicle comprising a main frame, traction means supporting the main frame for propulsion of the vehicle, an electric battery for supplying power for operation of said vehicle, a battery compartment in said main frame for disposition of said electric battery, said battery compartment extending to the front end of said vehicle, said main frame including a bottom plate member, said bottom plate member extending into said battery compartment at opposite sides of the battery compartment to form battery supporting shelves for said battery, said battery supporting shelves extending along said opposite sides of the battery compartment and being spaced from each other to provide an opening in the bottom of said main frame for access to the battery in said battery compartment, a front end opening in said main frame that forms a continuation of said bottom opening and providing access to the battery through said bottom opening from beneath said battery for removal of the battery from said battery compartment through the front end opening of the main frame and for placement of the battery in said battery compartment through the front end opening of the main frame, and said main frame including a top opening above said battery compartment to permit the battery to be raised off said battery supporting shelves and to permit the battery to be placed in the battery compartment in an elevated position and then to be lowered onto the battery supporting shelves.

9. An electric battery power operated vehicle as recited in claim 8 in which said battery comprises a box in which the battery cells are placed, said box including laterally extending wings each of which extends over a portion of the main frame, jacks in said main frame each disposed under a laterally extending wing of said battery box, and means to operate said jacks to raise said battery box up from said battery supporting shelves and to lower said battery box down onto said battery supporting shelves.

10. An electric battery power operated vehicle as recited in claim 8, and a stationary battery sled for said battery, said battery sled having a lateral dimension that is less than the distance between said battery supporting shelves in said bottom opening and having a vertical dimension that is greater than the height of said battery supporting shelves to receive said battery sled in said bottom opening under the battery and to lower the battery onto said battery sled thereby to remove the battery from said battery compartment.

11. An electric battery power operated vehicle comprising, a main frame, traction means supporting the main frame for propulsion of the vehicle, an electric battery for supplying power for operation of said vehicle, a battery compartment in said main frame for disposition of said electric battery, said battery compartment extending to the front end of said vehicle, said battery having a T configuration in plan in which the cross-arms of the T are disposed across the front of the main frame and the leg of the T extends rearwardly into the main frame, said battery compartment being complementally formed with respect to said T configuration of the battery, a jack in said main frame in each corner formed by the leg and a cross-arm of said battery T configuration to engage the battery to raise the battery from said battery supporting shelves and to lower the battery onto said battery supporting shelves, motor drive means for said vehicle traction means disposed in the main frame in the corner area between said leg of the battery T configuration and said cross-arm of the battery T configuration, portions of said main frame extending into said battery compartment and forming a battery supporting shelf for said battery, an opening in the bottom of said main frame providing access to the battery in said battery compartment, a front end opening in said main frame connecting to said bottom opening and providing access to the battery for removal of the battery from said battery compartment through the front end opening of the main frame and for placement of the battery in said battery compartment through the front end opening of the main frame.

12. An electric battery power operated vehicle comprising, a main frame, traction means supporting the main frame for propulsion of the vehicle, an electric battery for supplying power for operation of said vehicle, a battery compartment in said main frame for disposition of said electric battery, said battery compartment extending to the front end of said vehicle, said main frame including a bottom plate member, said bottom plate member extending into said battery compartment at opposite sides of the battery compartment to form battery supporting shelves for said battery, said battery supporting shelves extending along said opposite sides of the battery compartment and being spaced from each other to provide an opening in the bottom of said main frame for access to the battery in said battery compartment, a front end opening in said main frame that forms a continuation of said bottom opening and providing access to the battery through said bottom opening from beneath said battery for removal of the battery from said battery compartment through the front end opening of the main frame and for placement of the battery in said battery compartment through the front end opening of the main frame, and said main frame including a top opening above said battery compartment to permit the battery to be raised off said battery supporting shelves and to permit the battery to be placed in the battery compartment in an elevated position and then to be lowered onto the battery supporting shelves, and said main frame comprising a gate to close the battery compartment at the front end of the main frame, said gate forming the front wall of said main frame, a pivot connection of said gate to said main frame, means to open said gate by swinging the gate upwardly on said pivot connection to a position spaced above the top of the main frame.

References Cited

UNITED STATES PATENTS

| 1,335,243 | 3/1930 | Klingelsmith | 105—50 |
| 1,843,691 | 2/1932 | Mancha et al. | 105—51 |
| 1,875,627 | 9/1932 | Mancha et al. | 105—51 |
| 2,395,415 | 2/1946 | Maier | 280—12 |
| 2,970,550 | 2/1961 | Peterson | 105—50 |

FOREIGN PATENTS 900,529 10/1944 France.

LEO FRIAGLIA, Primary Examiner.

MILTON L. SMITH, Examiner.